United States Patent
Bauer et al.

(10) Patent No.: US 11,752,834 B2
(45) Date of Patent: Sep. 12, 2023

(54) VEHICLE HEATER

(71) Applicant: Eberspächer Climate Control Systems GmbH, Esslingen (DE)

(72) Inventors: Thomas Bauer, Dettingen (DE); Tobias Strobel, Bad Boll (DE); Günter Eberspach, Wolfschlugen (DE); Walter Blaschke, Deizisau (DE)

(73) Assignee: Eberspächer Climate Control Systems GmbH, Esslingen (DE)

( * ) Notice: Subject to any disclaimer, the term of this patent is extended or adjusted under 35 U.S.C. 154(b) by 130 days.

(21) Appl. No.: 17/146,704

(22) Filed: Jan. 12, 2021

(65) Prior Publication Data
US 2021/0213804 A1   Jul. 15, 2021

(30) Foreign Application Priority Data

Jan. 13, 2020   (DE) .................... 10 2020 100 512.1

(51) Int. Cl.
*B60H 1/22* (2006.01)
*F01N 3/10* (2006.01)
*B60H 1/03* (2006.01)

(52) U.S. Cl.
CPC ........... *B60H 1/2212* (2013.01); *B60H 1/036* (2013.01); *F01N 3/10* (2013.01)

(58) Field of Classification Search
CPC .......... B60H 1/2212; B60H 1/036; F01N 3/10
(Continued)

(56) References Cited

U.S. PATENT DOCUMENTS 3,989,030 A * 11/1976 Friedl ................. B60H 1/2212
431/263
4,923,033 A * 5/1990 Panick ..................... F23J 15/02
181/231
(Continued)

FOREIGN PATENT DOCUMENTS

| CA | 3 029 303 C | 6/2021 |
| DE | 1291496 B | 3/1969 |

(Continued)

OTHER PUBLICATIONS

"DE_1291496_B_I—Machine Translation.pdf", machine translation, EPO-org, Jan. 19, 2023. (Year: 2023).*

*Primary Examiner* — Steven B McAllister
*Assistant Examiner* — Daniel E. Namay
(74) *Attorney, Agent, or Firm* — McGlew and Tuttle, P.C.

(57) ABSTRACT

A vehicle heater includes a burner assembly unit (12) with a combustion chamber (18) to be fed with combustion air (V) and fuel (B) and a flame tube (24). A heat exchanger assembly unit (14) includes an inner heat exchanger housing (28) with an inner circumferential wall (30) and an outer heat exchanger housing (34) with an outer circumferential wall (36). A heat transfer medium flow space (40) is between the inner and outer heat exchanger housings, which are elongated in a longitudinal axis (L) direction. A waste gas backflow space (44), between the inner circumferential wall (30) and the flame tube, opens towards an exhaust gas outlet. A catalytic converter device (52) is provided in the waste gas backflow space associated with an energizable heating unit (58), or/and insulation material (64) is provided on an outer side (62) facing away from the heat transfer medium flow space.

3 Claims, 1 Drawing Sheet

(58) Field of Classification Search
USPC .................................................. 237/12.3 C
See application file for complete search history.

(56) References Cited

U.S. PATENT DOCUMENTS

| | | | | |
|---|---|---|---|---|
| 10,113,742 B2* | 10/2018 | Dell | ........................ | F23D 5/123 |
| 10,234,136 B2* | 3/2019 | Dell | ........................ | F23C 7/004 |
| 10,302,298 B2* | 5/2019 | Ilchenko | ................... | F23C 9/006 |
| 10,569,619 B2* | 2/2020 | Humburg | ................... | F23C 9/08 |
| 11,046,150 B2* | 6/2021 | Schlör | ...................... | F24H 1/009 |
| 11,312,209 B2* | 4/2022 | Collmer | ................... | F23C 9/006 |
| 2002/0117551 A1* | 8/2002 | Wolf | ..................... | B60H 1/2212 |
| | | | | 165/41 |
| 2011/0125385 A1* | 5/2011 | Eichenseher | ......... | F02D 41/266 |
| | | | | 701/1 |
| 2018/0072134 A1* | 3/2018 | Humburg | ................... | F23C 9/08 |

FOREIGN PATENT DOCUMENTS

| | | | | |
|---|---|---|---|---|
| DE | 4447285 A1 | 7/1996 | | |
| DE | 19806902 A1 | 9/1999 | | |
| DE | 10058794 A1 | 6/2002 | | |
| DE | 102016117408 A1 | 3/2018 | | |
| DE | 102018100216 B3 * | 3/2019 | .............. | B60H 1/22 |
| DE | 102018100216 B3 | 3/2019 | | |
| JP | H10236147 A | 9/1998 | | |
| RU | 103850 U1 | 4/2011 | | |
| RU | 2686414 C1 | 4/2019 | | |
| RU | 2705876 C1 | 11/2019 | | |
| WO | 9801702 A1 | 1/1998 | | |

* cited by examiner

VEHICLE HEATER

CROSS REFERENCE TO RELATED APPLICATIONS

This application claims the benefit of priority under 35 U.S.C. § 119 of German Application 10 2020 100 512.1, filed Jan. 13, 2020, the entire contents of which are incorporated herein by reference.

TECHNICAL FIELD

The present invention pertains to a vehicle heater, comprising a burner assembly unit and a heat exchanger assembly unit, wherein the burner assembly unit comprises a combustion chamber, which is to be fed with combustion air and fuel and a flame tube elongated in the direction of a longitudinal axis, which carries exhaust gas away from the combustion chamber, wherein the heat exchanger assembly unit comprises an inner heat exchanger housing with an inner circumferential wall elongated in the direction of the longitudinal axis, and, for example, with an inner base wall adjoining this inner circumferential wall in an axial end area of same, as well as an outer heat exchanger housing with an outer circumferential wall elongated in the direction of the longitudinal axis, and, for example, with an outer base wall adjoining this outer circumferential wall in an axial end area of same, wherein a heat transfer medium flow space is formed between the inner heat exchanger housing and the outer heat exchanger housing, wherein a waste gas backflow space open towards an exhaust gas outlet is formed between the inner circumferential wall and the flame tube, wherein a catalytic converter device, through which exhaust gas can flow, is provided in the waste gas backflow space.

TECHNICAL BACKGROUND

Such vehicle heaters are used in vehicles as parking heaters or auxiliary heaters and are generally configured to heat a, for example, liquid heat transfer medium such as the liquid coolant provided in a coolant circuit of an internal combustion engine.

SUMMARY

An object of the present invention is to provide a vehicle heater having a compact configuration, which can be operated efficiently and with low emission of harmful substances.

This object is accomplished according to the present invention by a vehicle heater, comprising a burner assembly unit and a heat exchanger assembly unit, wherein the burner assembly unit comprises a combustion chamber, which is to be fed with combustion air and fuel and a flame tube elongated in the direction of a longitudinal axis, which carries exhaust gas away from the combustion chamber, wherein the heat exchanger assembly unit comprises an inner heat exchanger housing with an inner circumferential wall elongated in the direction of the longitudinal axis, and, for example, with an inner base wall adjoining this inner circumferential wall in an axial end area of same, as well as an outer heat exchanger housing with an outer circumferential wall elongated in the direction of the longitudinal axis, and, for example, with an outer base wall adjoining this outer circumferential wall in an axial end area of same, wherein a heat transfer medium flow space is formed between the inner heat exchanger housing and the outer heat exchanger housing, wherein a waste gas backflow space, which is open towards an exhaust gas outlet, is formed between the inner circumferential wall and the flame tube, wherein a catalytic converter device, through which exhaust gas can flow, is provided in the waste gas backflow space.

This vehicle heater is characterized in that an electrically energizable heating unit is provided in association with the catalytic converter device, or/and that the outer heat exchanger housing is provided with insulation material overlapping in at least some areas on its outer side facing away from the heat transfer medium flow space.

By integrating a catalytic converter device, for example, a 3-way catalytic converter, into the waste gas backflow space, the content of harmful substances in the exhaust gas can be lowered without additional installation space having to be available for such a catalytic converter device. If the outer heat exchanger housing in the vehicle heater is thermally insulated in the outward direction by the insulation material, it is guaranteed that especially also at the start of combustion and at first with a still cold vehicle heater, especially also a cold catalytic converter device, the temperature thereof is raised rapidly, so that the catalytic reaction can already start after the start of combustion, and the time period, during which exhaust gas is emitted without the catalytic converter device being effective, is shortened. The provision of a heating unit associated with the catalytic converter device makes it possible to preheat the catalytic converter device or to keep the catalytic converter device warm independently of the combustion operation, so that the time period, during which the catalytic converter device cannot be effective during the combustion operation because of an excessively low temperature, can be avoided or at least shortened.

It should be pointed out that in the sense of the present invention insulation material is defined as any material which curbs the release of heat in the outward direction to the ambient air or to other system components and, for example, has a lower heat conductivity than the areas to be thermally insulated against one another, i.e., for example, the outer heat exchanger housing and the air which surrounds this heat exchanger housing. For example, fibrous or mat-like insulation material or foamed insulation material wound around the outer heat exchanger housing can be used.

In the case of the configuration of the vehicle heater according to the present invention as a liquid heater or water heater, the inner heat exchanger housing may have an inner base wall adjoining the inner circumferential wall in an axial end area of same, the outer heat exchanger housing may have an outer base wall in an axial end area adjoining this axial end area and the heat transfer medium flow space may be defined by a front wall in an axial end area located at a distance from the inner base wall and from the outer base wall for providing the heat transfer medium flow space, through which a liquid heat transfer medium can flow.

In order to guarantee an even better thermal insulation in such a configuration of the heat exchanger area for a liquid heat transfer medium, the front wall may be provided with an insulation material overlapping in at least some areas on its outer side facing away from the heat transfer medium flow space.

An especially efficient utilization of the heat provided by the heating unit can be achieved by the heating unit being provided at the inner circumferential wall.

For example, the heating unit may be provided on an outer side of the inner circumferential wall, which outer side is facing the heat transfer medium flow space.

For a configuration that is especially advantageous for the thermal interaction of the heating unit and the catalytic converter device, it is proposed that the heating unit be provided on an inner side of the inner circumferential wall, which inner side is facing the waste gas backflow space.

It is advantageous for an efficient heating of the catalytic converter device if the heating unit is provided in at least one length area of the inner circumferential wall, which length area overlaps the catalytic converter device axially.

According to another configuration aspect, a lambda probe around which exhaust gas can flow may be provided. By means of such a lambda probe, information about the quality of the combustion can be provided in order to be able in this manner to set the desired combustion characteristic by means of influencing the combustion air/fuel quantitative ratio. Further, such a lambda probe may also be used as a flame sensor, since the starting or ending of the combustion is reflected directly in the output signal of the lambda probe.

The present invention further pertains to a process for operating a vehicle heater configured according to the present invention, wherein the vehicle heater has an electrically energizable heating unit associated with the catalytic converter device. In this process, the electrically energizable heating unit that is associated with the catalytic converter device is operated in a start phase of the combustion operation or/and in an end phase of the combustion operation or/and after a flame-out.

Thus, due to the heat provided during the operation of the heating unit the catalytic converter device can be heated before the start of the combustion such that immediately when the combustion occurs, the exhaust gas generated can be subjected to a catalytic reaction in the catalytic converter device. In a switch-off phase of a vehicle heater or if a flame-out occurs, the catalytic converter device can be kept at a temperature, which guarantees that a discharge of exhaust gas not treated catalytically is avoided, due to the operation of the heating unit.

In the process according to the present invention, the heat output of the electrically energizable heating unit that is provided in association with the catalytic converter device can be lowered after the start of combustion in the start phase of the combustion operation or/and in case of a restart after a flame-out. With combustion starting, the catalytic converter device may be heated or kept warm solely because of the heat transported in the exhaust gas, so that an additional introduction of heat by means of the heating unit is no longer necessary.

Further, provisions may be made that in the end phase of the combustion operation or/and in case of a flame-out, the heat output of the electrically energizable heating unit provided in association with the catalytic converter device is raised after the end of combustion.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
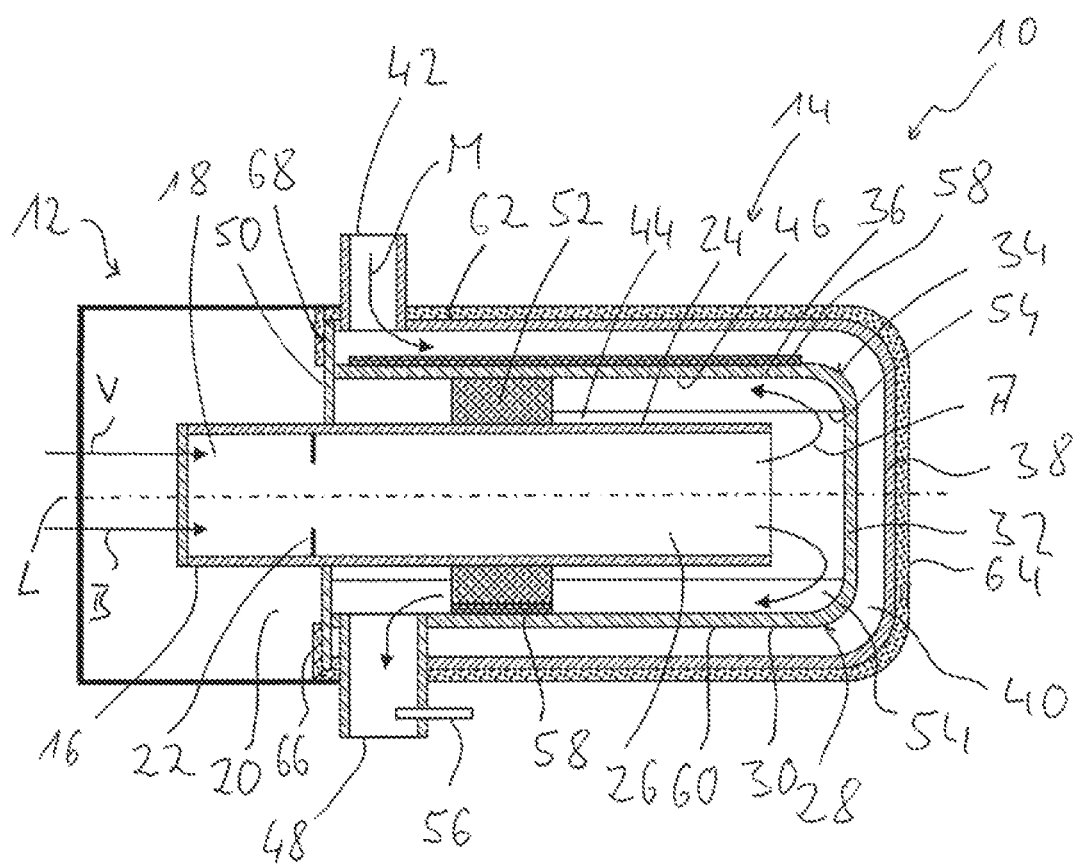
FIG. 1 is a longitudinal sectional view of a fuel-operated vehicle heater.

Referring to the drawings, a fuel-operated vehicle heater 10, which is shown in FIG. 1, comprises a burner assembly unit, which is generally designated by 12, as well as a heat exchanger assembly unit, which is generally designated by 14. The burner assembly unit 12, which is shown largely in a schematic diagram, comprises a combustion chamber 18 formed in a combustion chamber housing 16. Combustion air V is fed by means of a combustion air feed unit, not shown, for example, a side channel blower, and fuel B is fed by means of a fuel feed unit, also not shown, for example, a feed pump to this combustion chamber. In case of the embodiment of the burner assembly unit 12 as a vaporizing burner, the fuel B can be fed into a porous evaporator medium that is provided in the combustion chamber 18 and can be released in gaseous or vaporous form into the combustion chamber 18 via this porous evaporator medium. Combustion air V may be introduced into the combustion chamber 18 via a volume 20 surrounding the combustion chamber housing 16 and passage openings formed in the combustion chamber housing 16.

The mixture of combustion air V and fuel B formed in the combustion chamber 18 can be ignited by an ignition element, not shown, for example, a glow plug, so that when combustion then proceeds in the combustion chamber 18, exhaust gas A can enter through a flame diaphragm 22 into a waste gas flow space 26 formed in a flame tube 24. A part of the mixture of combustion air V and fuel B may also be burned in the waste gas flow space 26.

The flame tube 24 extends into the heat exchanger assembly unit 14, which is basically provided with a pot-like structure. The heat exchanger assembly unit 14 comprises an inner heat exchanger housing 28 with an inner circumferential wall 30, which, just as the flame tube 24, is elongated in the direction of a longitudinal axis L. In an axial end area, the inner circumferential wall 30 adjoins an inner base wall 32 of the inner heat exchanger housing 28. The inner circumferential wall 30 and the inner base wall 32 are advantageously formed integrally with each other. For example, the inner heat exchanger housing 28 may be provided as a cast metal component.

The heat exchanger assembly unit 14 further comprises an outer heat exchanger housing 34. The outer heat exchanger housing 34 is also provided with a basically pot-like structure and comprises an outer circumferential wall 36 and an outer base wall 38 adjoining this outer circumferential wall in an axial end area. The outer heat exchanger housing 34 is also advantageously provided as an integral component with its outer circumferential wall 36 and with its outer base wall 38. Since the thermal load is lower in the area of the outer heat exchanger housing 34 than in the area of the inner heat exchanger housing 28, the outer heat exchanger housing 34 may, in principle, also be provided as a plastic component.

A heat transfer medium flow space 40 is formed between the inner heat exchanger housing 28 and the outer heat exchanger housing 34. A heat transfer medium M to be heated may enter the heat transfer medium flow space 40 via an inlet pipe 42, flow through this heat transfer medium space 40 and leave the heat transfer medium flow space 40 via an outlet pipe that cannot be seen in FIG. 1.

A waste gas backflow space 44 is formed between the inner circumferential wall 30 and the flame tube 24. The exhaust gas A being released from the flame tube 24 at its end located opposite the inner base wall 32 is deflected in the radially outward direction at the inner base wall 32 and flows in a flow direction essentially opposite the flow in the waste gas flow space 26 along an inner side 46 of the inner circumferential wall 30 in the direction towards an outlet pipe 48. After flowing through the waste gas backflow space 44 and after the release of heat to the inner heat exchanger housing 28 and via this heat exchanger housing 28 to the heat transfer medium M flowing through the heat transfer medium flow space 40, the exhaust gas A may leave the heat exchanger assembly unit 14 via the outlet pipe 48.

The heat transfer medium flow space 40 and the waste gas backflow space 44 may be closed by a common front wall 50 at its axial end areas located at a distance from the inner base wall 32 or from the outer base wall 38. It should be pointed out that front walls, which are also formed separately from each other for the heat transfer medium flow space 40 and the waste gas backflow space 44, may, of course, be provided to close same. For example, the combustion chamber housing 16 or the flame tube 24 may also be carried at the front wall 50 or at one of these front walls. Further, the front wall axially defining the heat transfer medium flow space 40 may be provided as an integral component of one of the two heat exchanger housings 28, 34, especially of the inner heat exchanger housing 28 as well.

A catalytic converter device generally designated by 52 is provided in the waste gas backflow space 44. This catalytic converter device comprises a, for example, monolithic carrier that is configured with openings or as being porous, the surface of which is provided with catalytically active material. The exhaust gas A flowing through the waste gas backflow space 44 thus flows forcibly through the catalytic converter device 52 and is in the process subjected to a catalytic reaction in order to lower the content of harmful substances in the exhaust gas A. For example, the catalytic converter device may be configured as a 3-way catalytic converter.

In order to improve the transfer of heat to the inner heat exchanger housing 28, this inner heat exchanger housing may have a plurality of heat transfer ribs 54 on the inner side 46 of the inner circumferential wall 30. In this case, FIG. 1 shows different configurations of the heat transfer ribs 54 in its upper half, on the one hand, and in its lower half, on the other hand. While the heat transfer ribs 54 extend only over a partial area of the axial extension of the inner circumferential wall 30 and the catalytic converter device 52 is positioned axially adjacent to the heat transfer ribs 54 in the upper half of FIG. 1, in the variant shown in the lower half of FIG. 1 the heat transfer ribs 54 are extended, for example, over the entire axial length of the inner circumferential wall 30, and the catalytic converter device 52 has recesses associated with the heat transfer ribs 54, so that the catalytic converter device 52 can mesh with intermediate spaces between heat transfer ribs 54 following one another in the circumferential direction, and it is not possible for exhaust gas A to reach the outlet pipe 48 without flowing through the catalytic converter device 52.

A lambda probe 56 is carried at the outlet pipe 48. The signal generated by this lambda probe may be fed into an actuating unit, not shown, so that by analyzing this output signal of the lambda probe, it is possible to recognize with what quality the combustion in the combustion chamber 18 or in the waste gas flow space 26 is taking place, i.e., for example, whether a hyperstoichiometric mixture of combustion air V and fuel B is being burned, a hypostoichiometric mixture of combustion air V and fuel B is being burned or whether the burned mixture is stoichiometric, so that the combustion is taking place at a lambda value of about 1. Due to the information provided by the lambda probe 56, it is possible to produce a mixture to be provided for the desired combustion characteristic by means of a corresponding setting of the quantity of combustion air A or fuel B being fed to the combustion chamber 18.

Since the output signal of the lambda probe depends on the composition of the exhaust gas A that is flowing around this lambda probe or generally of the gas that is flowing around this lambda probe, this signal may also be used to provide information about whether combustion is taking place at all in the combustion chamber 18. This means that the lambda probe 56 may at the same time also be used as a flame sensor in order thus to provide information about whether a combustion is taking place in the combustion chamber 18 or whether the combustion in the combustion chamber 18 has ended.

Further, an electrically energizable heating unit, which is generally designated by 58, is provided in association with the catalytic converter device 52. In this case as well, FIG. 1 shows two different configuration variants in its upper half, on the one hand, and in its lower half, on the other hand. In both configuration variants, the electrically energizable heating unit 58 is provided at the inner circumferential wall 30 of the inner heat exchanger housing 28. In the variant shown at the top in FIG. 1, the electrically energizable heating unit 58 is arranged on the outer side 60 of the inner circumferential wall 30, which outer side 60 faces the heat transfer medium flow space 40 and thus is located essentially in the heat transfer medium flow space 40, or the heat transfer medium M which flows in the heat transfer medium flow space 40 flows around the outer side.

The heating unit 58 extends approximately over the entire axial length of extension of the inner circumferential wall 30 and may advantageously be arranged enclosing this inner circumferential wall 30 over the entire outer circumference thereof. In this case, the heating unit 58 especially also overlaps the axial length area of the inner circumferential wall 30, in which the catalytic converter device 52 is positioned and with its outer circumferential area is positioned adjoining the inner side 46 of the inner circumferential wall 30.

With the heating unit 58 configured in this manner, it becomes possible to transfer heat to the heat transfer medium M flowing through the heat transfer medium flow space 40, so that, in addition or as an alternative to the combustion operation, in at least some phases, the heat transfer medium M may also be heated by electric heating. Further, the heating unit 58 may also be used to heat the catalytic converter device 52, so that, as will be explained below with reference to FIG. 2, also in operating phases, in which the catalytic converter device 52 cannot or cannot sufficiently be heated by exhaust gas A in order to make possible the starting or the carrying out of the catalytic reaction, the catalytic converter device 52 may be sufficiently heated due to operation of the heating unit 58.

In the configuration variant shown at the bottom in FIG. 1, the electrically energizable heating unit 58 is provided on the inner side 46 of the inner circumferential wall 30 and encloses the outer circumferential wall of the catalytic converter device 52, for example, also in the areas, in which this catalytic converter device 52 has recesses for accommodating the heat transfer ribs 54. In this variant, a reinforced thermal contact between the heating unit 58 and the catalytic converter device 52 and thus an even more efficient heating of same is guaranteed, while heat can be transferred to the heat transfer medium M flowing in the heat transfer medium flow space 40 via the thermal contact between the heating unit 58 and the inner circumferential wall 30. Also in the configuration variant shown at the bottom in FIG. 1, the heating unit 58 extends over the axial length area of the inner heat exchanger housing 28, in which the catalytic converter device 52 is provided, so that an efficient heating taking place over the entire axial extension area of the catalytic converter device 52 may also be provided here. Of course, a greater axial extension of the heating unit 58 could also be provided in this embodiment, while in the variant shown at the top in FIG. 1, the axial extension of the heating unit 58 could be limited to the length area, in which the catalytic converter device 52 is provided in the waste gas backflow space 44. A heating unit 58 each could also be provided both on the inner side 46 and on the outer side 60 of the inner circumferential wall 30.

In order to be able to avoid heat losses in the outward direction as much as possible in the vehicle heater 10, the outer heat exchanger housing 34 is preferably coated essentially completely with thermally insulating insulation material 64 on an outer side 62 facing away from the heat transfer medium flow space 40. This insulation material, which is applied in one or more layers and which may be, for example, foamed material or fibrous or mat-like material, prevents excessive heat losses in the outward direction. Such thermally insulating insulation material 66 may also be provided, for example, on an outer side 68 of the front wall 50, which outer side faces away from the heat transfer medium flow space 40, at least where this front wall 50 closes the heat transfer medium flow space at its axial end facing away from the base walls 32, 38. In principle, the insulation material 66 could also extend even farther in the radial inward direction and also overlap the part of the front wall 50 on the outer side 68 thereof, in which part this front wall 50 closes the waste gas backflow space 44. Thus, due to the insulation material 66 heat losses in the direction towards the burner assembly unit 12 or in the direction towards components or system areas of the burner assembly unit 12 adjoining the front wall 50 can be avoided.

With the configuration of a fuel-operated vehicle heater shown in FIG. 1, an efficient operation with low emission of harmful substances is made possible. The content of CO, HC, $NO_2$ or NO in the exhaust gas A can be markedly reduced by using the catalytic converter device, especially when the vehicle heater 10 is operated with a combustion operation in the range of lambda 1 using the information provided by means of the lambda probe 56. Even when using fuel containing ethanol, it is possible to operate the vehicle heater 10 with a low emission of harmful substances. Since the lambda probe 56 may at the same time also be used as a flame sensor, it is possible to dispense with the provision of an additional flame sensor, and the integration of the catalytic converter device 52 in the waste gas backflow space 44 avoids the need to have to provide additional assembly units, which make possible the mounting of such a catalytic converter device, for example, downstream of the outlet pipe 48.

Due to the thermal insulation which is embodied by means of the insulation material 64 or 66 and to the possibility of heating the catalytic converter device 52 by means of the heating unit 58, it can be further ensured that a time period of the combustion operation, in which exhaust gas A which is not subjected to a catalytic reaction is emitted, is not present or is at least markedly shortened. This will be explained below with reference to FIG. 2.

Figure 2:
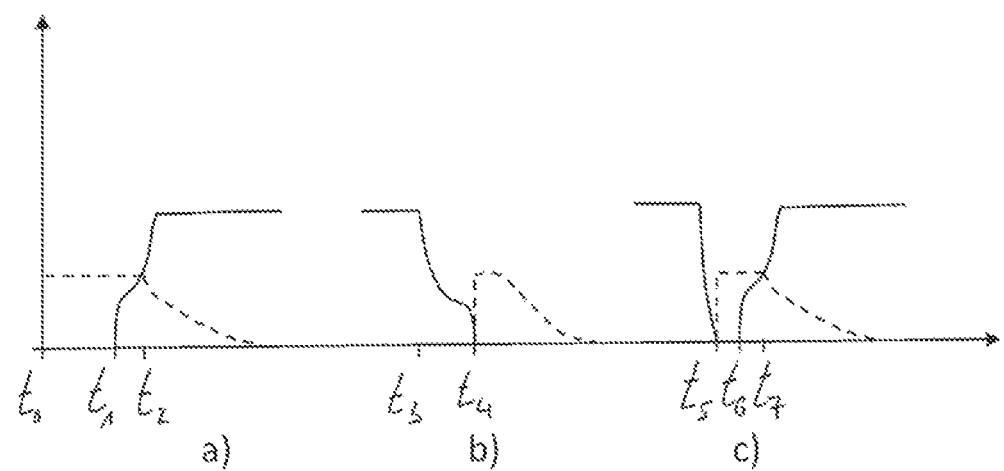
FIG. 2 is a view showing graphs a), b) and c) of the heat generated during the combustion operation or by an electrically energizable heating unit in different phases of operation of a fuel-operated vehicle heater.

FIG. 2 shows, plotted over time, the quantity of heat introduced in different operating states by combustion or heat output provided by combustion (solid line) and the quantity of heat introduced by the electrically energizable heating unit 58 or heat output provided (broken line). In this case, FIG. 2 shows at graph portion a) the start phase of the combustion operation. If a command to start the vehicle heater 10 is outputted, for example, at the time $t_0$, then, in association with other actions, e.g., the preheating of the ignition element, the heating unit 58 can be activated, i.e., be switched on. Due to the heating operation of the heating unit 58, the catalytic converter device 52 is preheated and is brought to a temperature, which is close to, advantageously above, the starting temperature for the catalytic reaction, already before starting the combustion. At a time $t_1$, after starting the fuel feed, the mixture formed in the combustion chamber 18 begins to burn and the introduction of heat due to the burning mixture of fuel B and combustion air V increases. The start of the combustion at the time $t_1$ may be recognized on the basis of the output signal of the lambda probe 56. For example, a predefined time period after the start of the combustion or when the combustion has reached a defined quality at a time $t_2$, the heat output of the heating unit 58 may advantageously gradually be lowered, since it is then guaranteed that the catalytic converter device 52 can be kept at a temperature, which makes it possible to carry out the catalytic reaction, solely due to the heat transported in the exhaust gas A. In this start phase of the combustion, i.e., between the times $t_1$ and $t_2$, the vehicle heater 10 may be fed, for example, with fuel B and combustion air V such that the combustion takes place with a lambda value in the range of 1.5-2.0. After that, i.e., during the normal combustion and heating operation, the vehicle heater 10 may be operated with a lambda value in the range of about 1.0.

FIG. 2 shows at graph portion b) a state, in which the combustion in the combustion chamber 18 shall be ended in a controlled manner. If a command to end the combustion is outputted, for example, at a time $t_3$ and if, in association with this, the feed of fuel to the combustion chamber 18 is reduced or ended, the introduction of heat gradually decreases because of the combustion taking place in the combustion chamber 18. At a time $t_4$, the combustion may be ended with the full extinguishing of the flame. At this time $t_4$, the heat output provided by the heating unit 58 or the quantity of heat introduced into the system may then be raised, for example, be spontaneously raised, so that in case of the catalytic converter device 52 at first still being sufficiently warm because of the combustion taking place beforehand, cooling off below the temperature that makes it possible to carry out the catalytic reaction is subsequently prevented. Consequently, the heat output of the heating unit 58 may also gradually be lowered, so that it is guaranteed that exhaust gas portions still being discharged can flow through the catalytic converter device 52 at a still sufficiently high temperature, for example, due to a continued delivery of combustion air V.

FIG. 2 shows at graph portion c) the occurrence of a flame-out, for example, because of a fuel feed temporarily interrupted due to the formation of bubbles or other circumstances. If the combustion comes to a standstill in case of a flame-out at the time $t_5$, the heating unit 58 is energized or the introduction of heat provided by this heating unit 58 is raised, so that it is guaranteed that the catalytic converter device 52 is kept at a temperature necessary for carrying out the catalytic reaction by the heating unit 58 until a restart of the combustion at the time $t_6$ and especially until the heat then transported in the exhaust gas A guarantees a sufficient heating of the catalytic converter device 52. At a time $t_7$, it is then, for example, again at a predefined time period after the time $t_6$ or when the quantity of heat provided by the combustion is sufficiently large, possible to begin lowering the introduction of heat by the heating unit 58 again.

It is obvious that activation of the heating unit 58 described above with reference to FIG. 2 may also take place differently in different operating phases. Thus, for example, in case of a controlled ending of the combustion operation or if a flame-out occurs, raising of the heat output provided by the heating unit 58 may be started already before the ending of the combustion, for example, when a significant change in the combustion state is detected on the basis of the output signal of the lambda probe 56.

While the heater described above may especially advantageously be used as a vehicle heater, it is obvious that this heater may also be used in other environments that are to be heated, for example, buildings, ships or the like. The intended purpose as a vehicle heater is hence defined in the sense of the present invention only as a suggestion for an especially advantageous use.

While specific embodiments of the invention have been shown and described in detail to illustrate the application of the principles of the invention, it will be understood that the invention may be embodied otherwise without departing from such principles.

What is claimed is:

1. A vehicle heater comprising:
   a burner assembly unit comprising a combustion chamber configured to be fed with combustion air and fuel, and a flame tube elongated in a direction of a longitudinal axis and configured to carry exhaust gas away from the combustion chamber; and
   a heat exchanger assembly unit comprising an inner heat exchanger housing with an inner circumferential wall elongated in the direction of the longitudinal axis, and an outer heat exchanger housing with an outer circumferential wall elongated in the direction of the longitudinal axis;
   a heat transfer medium flow space between the inner heat exchanger housing and the outer heat exchanger housing;
   a waste gas backflow space between the inner circumferential wall and the flame tube, the waste gas backflow space being open towards an exhaust gas outlet;
   a catalytic converter device provided in the waste gas backflow space and configured for exhaust gas to flow through the catalytic converter device;
   an electrically energizable heating unit provided in association with the catalytic converter device, the heating unit being provided at the inner circumferential wall surrounding an outer side of the inner circumferential wall facing the heat transfer medium flow space such as to overlap the axial length area of the inner circumferential wall surrounding the catalytic converter device and such as to be in direct contact with fluid in the heat transfer medium flow space.

2. The vehicle heater in accordance with claim 1, wherein:
   the inner heat exchanger housing has, in an axial end area of the inner circumferential wall, an inner base wall adjoining the inner circumferential wall;
   the outer heat exchanger housing has, in an axial end area, an outer base wall adjoining the axial end area;
   the heat transfer medium flow space is defined by a front wall in an axial end area located at a distance from the inner base wall and from the outer base wall; and
   the front wall is provided with the insulation material in at least some areas on an outer side facing away from the heat transfer medium flow space.

3. The vehicle heater in accordance with claim 1, further comprising a lambda probe disposed in a position around which exhaust gas can flow.

* * * * *